Aug. 21, 1956 C. H. O. BERG 2,759,879
PROCESS FOR HYDROCARBON CONVERSION WITH THE
USE OF A MOVING BED OF CATALYSTS AT
DIFFERERENT TEMPERATURE LEVELS
Filed April 26, 1951
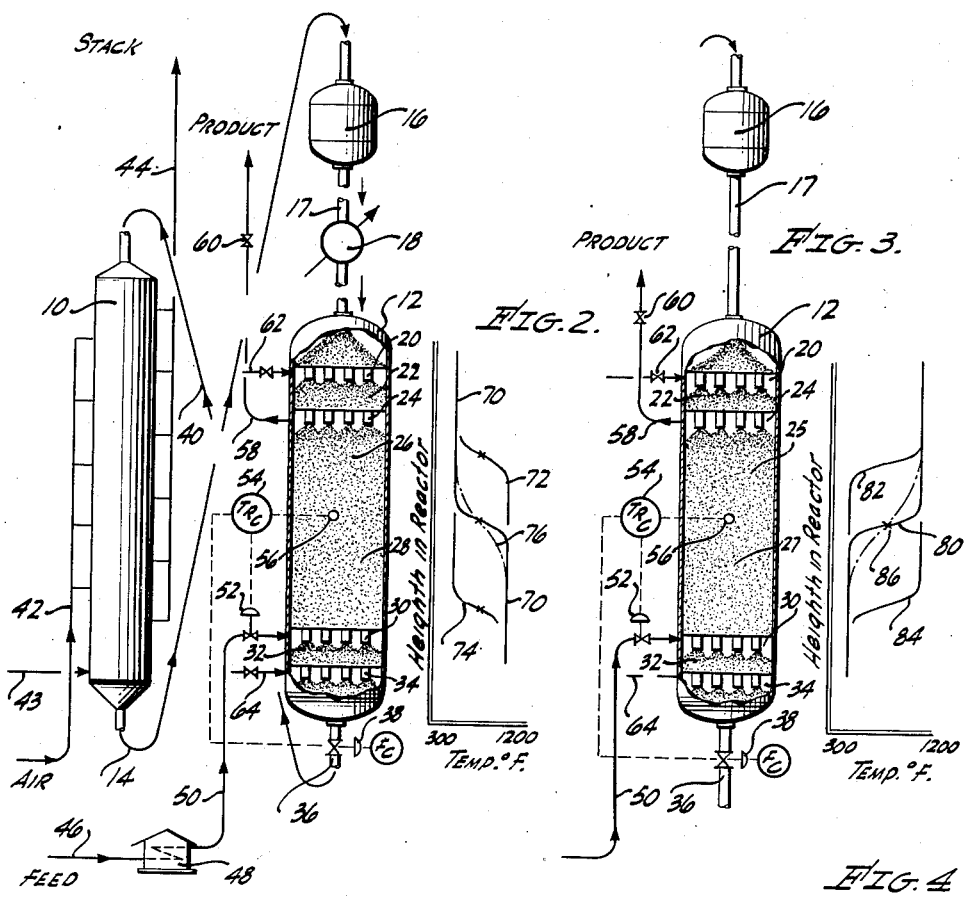
INVENTOR.
CLYDE H. O. BERG,
BY
AGENT.

United States Patent Office 2,759,879
Patented Aug. 21, 1956

2,759,879

PROCESS FOR HYDROCARBON CONVERSION WITH THE USE OF A MOVING BED OF CATALYSTS AT DIFFERENT TEMPERATURE LEVELS

Clyde H. O. Berg, Long Beach, Calif., assignor to Union Oil Company of California, Los Angeles, Calif., a corporation of California Application April 26, 1951, Serial No. 223,103

19 Claims. (Cl. 196—52)

This invention relates to catalytic conversions involving a contact of a fluid with a solid catalyst and in particular relates to such conversions wherein a dual temperature level is desired, that is wherein the fluid contacts the catalyst at two substantially different temperatures. Specifically this invention relates to the catalytic conversion of hydrocarbons in which a plurality of catalytic reactions are carried out or in which a single reaction is carried out at successively different temperatures.

It has been long known that the removal of nitrogen from a gas oil feed stock to a catalytic cracking process exerts a beneficial effect upon the effectiveness of the catalytic treating step, that is a higher degree of cracking is obtained in the treatment of a nitrogen-free feed stock than is obtained in the cracking of a nitrogen-containing feed stock under the same conditions.

It has further been found that the catalytic treatment of petroleum fractions on catalysts is often desirably carried out by passing the hydrocarbon in contact with the catalyst in two stages each utilizing a different temperature.

The foregoing are examples of situations in which catalytic processes involve the requirement of a dual temperature level to effect a given result. The present invention therefore is directed to an improved method for operating a countercurrent catalytic process in which a moving bed of solid granular catalyst is handled in such a way as to establish two finite treating zones within the volume of catalyst constituting the contacting zone, which contacting zones exist at temperature levels which are substantially different from each other.

It is therefore a primary object of the present invention to provide an improved catalytic process in which reactions may be carried out in contact with a single catalyst stream at substantially different temperature levels in well-defined reaction zones.

Another object of this invention is to provide for the countercurrent contacting of a substantially compact moving bed of granular solid catalyst and a fluid to be contacted in which control of the inlet temperatures of the granular solids and the fluid, as well as the mass specific heats of these two streams, are controlled within certain limits to establish a relatively sharp temperature break within the treating zone and to establish two reaction zones operating at substantially different temperature levels.

It is an additional object of this invention to establish within a moving bed of granular catalyst a catalyst temperature break without the use of injected streams of either catalyst or fluid.

It is a specific object of this invention to provide an improved process for the conversion of petroleum hydrocarbon fractions within a single catalyst bed simultaneously at substantially different temperatures.

Another object of this invention is to provide an apparatus for the accomplishment of the foregoing objects.

The present invention comprises a process for the countercurrent contact of a substantially compact moving bed of solid granular material and a fluid to be reacted or converted in a contacting or treating zone in which two distinct temperature zones are established, one comprising a relatively low temperature zone and the other a relatively high temperature zone coexisting within a single moving granular catalyst bed in the contacting zone and separated by a sharp temperature gradient. These distinct reaction zones having substantially different temperature levels are established by passing into the contacting zone a solids stream having a temperature substantially the same as that desired in one of the two zones, and passing a fluid to be contacted countercurrently through the contacting zone and introduced at a temperature which is substantially the same as that desired in the other zone. Either the solids or the fluid may be introduced at the higher temperature and desirable results described below are obtainable in both modifications.

The granular solids and the fluid pass through the treating zones successively countercurrent to each other and at a solids-to-fluid ratio such that the product of the weight rate of solids times its specific heat is substantially equal to the product of the weight rate of fluid times its specific heat. Under such conditions the heat capacity on a time basis of the solids stream flowing in one direction is substantially equal to the heat capacity of the fluid stream passing in the opposite direction.

One preferred modification of the present invention is its application to the treatment of hydrocarbon fractions in the presence of a catalyst wherein the equality relationship of heat capacities referred to above is preferably controlled to exist at the average of the temperatures of two reaction zones.

In the present specification the mass specific heat is defined as the product of the weight rate and the specific heat of either the actalyst or fluid flowing through the contacting zone. The mass specific heat ratio is defined as the ratio of the mass specific heat of the solids to that of the fluid flowing through the contacting zone. In the present invention the mass specific heat ratio preferably is maintained at a value of 1.0 wherein the mass specific heat of the solids and fluid streams are equal. However, values between about 0.5 and 2.0 and sometimes values between about 0.2 and 5.0 may be employed to achieve certain specific thermal results including the establishment of different contact times in the low and high temperature zones.

In a contacting zone in which the mass specific heat ratio is substantially 1.0 and the granular catalyst is introduced at a relatively low temperature while the fluid to be contacted is introduced at a relatively high temperature, a temperature break is established at some point within the moving mass of material which is substantially equal to the difference in the temperatures of the entering streams. When the mass specific heat of one stream is greater than that of the other stream the stream having the greater mass specific heat tends to dominate the thermal effect of the stream having the lower mass specific heat and the temperature break referred to is moved in a direction toward the outlet of the stream having the higher mass specific heat. Thus, for example, if a mass specific heat ratio greater than 1.0 is employed the mass specific heat of the catalyst moving downward exceeds that of the fluid flowing upward, and if the catalyst enters cold and the fluid enters hot the greater proportion of the contacting zone will be at a temperature substantially that at which the catalyst is introduced, with a temperature break existing near the fluid inlet at which the catalyst rises substantially to the temperature of the entering fluid. Conversely, if the mass specific heat ratio is less than 1, as is the case when the mass specific heat of the fluid exceeds that of the solids and the fluids and solids enter at different temperatures, the major proportion of the contacting zone will exist substantially at the temperature of the entering fluid, with a temperature break adjacent the fluid outlet at which the catalyst temperature abruptly changes from a value substantially that of the entering fluid to the value of the entering solids.

By controlling the position of the temperature break within a given contacting zone the residence time of the fluid in each zone of different temperature may be controlled to effect the desired reaction. In one instance, wherein the fluid is desirably contacted with a catalyst at a temperature of 900° F. and also at a temperature of 400° F., the catalyst may be introduced at the lower temperature and the fluid may be introduced at the higher temperature under such conditions that the mass specific heat ratio defined above is about 1.0. The position of the temperature break may be controlled in accordance with a temperature recorder controller actuated by the average temperature of 650° F. existing approximately at the center of the contacting zone. The temperature break may be maintained at this point by controlling preferably the fluid flow rate or, less preferably, the catalyst or solids flow rate in accordance with changes in the indicated temperature. Other modifications corresponding to the previous general discussion may be made in which the solids are introduced at the elevated temperature and the fluid is introduced at the lower temperature.

The position of the temperature break within the contacting zone is a function of the deviation of the mass specific heat ratio from 1.0, that is when the ratio is approximately 1 the temperature break is easily controllable to a position substantially at the mid-point of the contacting zone. When the specific heat ratio is less than 1 the temperature break exists within the contacting zone at the fluid outlet, whereas if the ratio is greater than 1 the temperature break exists adjacent the fluid inlet within the contacting zone. The contacting zone in each case is defined as that portion of the equipment between the fluid inlet and fluid outlet which is filled with granular solids to be contacted.

The sharpness of the temperature break or temperature gradient within the solids bed, that is, the rapidity with which the temperature changes with distance along the direction of either fluid or catalyst flow, is a complex function of the heat transfer coefficient existing between the fluid and the granular solids as well as the variation in specific heat with temperature of both the fluid and the granular contacting material.

For example, a silica-alumina cracking catalyst has a specific heat which is variable between values of about 0.245 B. t. u./lb./° F. and about 0.255 B. t. u./lb./° F. at temperatures of 400° F. and 800° F., respectively. A typical gasoline fraction has a variable specific heat in the vapor phase of 0.53 B. t. u./lb./° F. at 400° F. and 0.83 B. t. u./lb./° F. at 800° F. It is therefore apparent that with changes in operating temperature the mass specific heat ratio existing within the contacting zone is variable with temperature. Therefore, if it is desired to control the temperature break at a point substantially midway between the ends of the contacting zone, wherein a downwardly moving bed of catalyst passes by gravity countercurrent to a flow of gasoline vapor to be treated, a mass specific heat ratio of 1.0 is desirable, which at 600° F. is equivalent to a catalyst-to-oil weight ratio of 2.5 pounds of silica-alumina cracking catalyst per pound of gasoline. When the catalyst is introduced at 400° F. the mass specific heat ratio existing in the low temperature reaction zone at the upper portion of the moving bed is 1.18, under which conditions the catalyst flow dominates, tending to force the temperature break down the column. At the mid-point of the temperature break at 600° F. the mass specific heat ratio is 1.0. At the opposite end of the contacting zone wherein gasoline vapor is introduced at 800° F. the mass specific heat ratio is 0.86, in which case the oil vapor dominates the catalyst flow, tending to force the temperature break upward. Thus, under such conditions the temperature break or gradient tends to be sharper (a greater change in temperature with distance through the bed of solids) than it would ordinarily be if the mass specific heat ratio were constant with changes in temperature.

This effect is a particularly desirable one since the dual temperature zones are more clearly defined on opposite sides of a sharp temperature gradient. In the foregoing example with the catalyst introduced at 400° F. and moving downwardly, and with the gasoline vapor introduced at 800° F. and moving upwardly, an 800° F. high temperature reaction zone is established near the bottom of the column and a 400° F. low temperature reaction zone simultaneously near the top of the column.

The foregoing operation is illustrative of the conditions which are applicable to the simultaneous desulfurization, at the relatively higher temperature, and denitrogenation of hydrocarbon vapors such as gasoline. Because of the upper cool zone the hydrocarbon compounds of nitrogen are adsorbed therein and returned with the catalyst to the lower hot zone wherein they are desorbed and returned to the cool zone until ultimate conversion to a hydrocarbon fragment and ammonia is obtained. Similar results are obtained with the hydrocarbons of higher boiling point. The catalysts which are applicable particularly in this operation include the conventional catalytic cracking catalysts such as the acid-treated natural clays, the synthetic silica-alumina beads, and preferably the improved synthetic beads containing slight percentages of chromium which facilitate regeneration, approximately 0.005% by weight of chromium being employed.

In a further example of the present invention the hydrocarbon cracking catalyst is introduced at 950° F. and the cracking stock is introduced at a temperature of from 300° F. to 700° F. (depending upon its maximum boiling point) in the vapor phase countercurrent to the catalyst flow. At the relatively low temperature reaction zone established adjacent the fluid inlet active denitrogenation by adsorption of the nitrogen hydrocarbons in the fluid occurs. The denitrogenated vapor subsequently passes into the 950° F. high temperature reaction zone wherein active high efficiency catalytic cracking of the substantially nitrogen-free hydrocarbon vapor take place. Also desulfurization occurs if sulfur is present.

In both of the foregoing examples it is preferred to employ inert gas seals at the extremities of the contacting or reaction zone to prevent loss of hydrocarbon fluid therefrom or the entry of extraneous materials. Also a steam seal at the catalyst inlet serves to hydrate the catalyst effecting beneficial results illustrated subsequently.

It should be understood that the foregoing examples, applicable to the conversion of hydrocarbons on granular catalysts, are not intended to limit the applicability of the present invention but are only illustrative thereof. The principles of the present invention are likewise applicable to any catalytic conversion in which it is desired to establish two temperature levels within the same catalyst bed.

In the upgrading of petroleum naphthas by such a combination process, denitrogenation is effected at temperatures between about 300° F. and 700° F. depending upon the end point of the stock to be treated and desulfurization or cracking or other reforming operation is effected at temperatures between 700° F. and 1200° F.

Preferably the process of the present invention as described above is operated in conjunction with a catalyst regeneration step by means of which spent catalyst from the reaction zone is returned to its high initial activity. In hydrocarbon conversion operations and in some other catalytic conversions, wherein carbon is deposited, the regeneration consists of the oxidation of coke and hydrocarbonaceous materials from the surface of the catalyst. The spent catalyst is conveyed by any convenient means from the bottom of the reaction or conversion vessel to a regeneration vessel and is subsequently returned from the regeneration vessel to the contacting vessel.

In processes using silica-alumina cracking catalysts in hydrocarbon conversions, it is preferable to hydrate the regenerated catalyst in an atmosphere of steam before contacting it with hydrocarbon vapors since a hydrated catalyst is found to give materially improved results over those processes in which regenerated catalyst is used directly from the regeneration zone. Catalyst hydration may be done by injecting steam into the bottom of the regeneration zone via line 43 or by employing a steam seal at the top of the contacting vessels as shown in the drawings or by using a mixture of steam and air as a regenerating gas.

The effect of catalyst hydration is seen from the following data obtained in the treating of cracked gasoline for denitrogenation with silica-alumina cracking catalyst at a low temperature zone temperature of 650° F. The light gasoline fraction of the feed stock (end point about 325° F.) contains 0.34% by weight sulfur and 0.025% by weight nitrogen while the heavy gasoline (end point 400° F.) contains 0.39% by weight sulfur and 0.093% by weight nitrogen. The product analyses in two runs, one using an unhydrated catalyst and the other employing a steam hydrated catalyst, are shown below:

|  | Unhydrated | | Hydrated | |
| --- | --- | --- | --- | --- |
|  | Percent S | Percent N | Percent S | Percent N |
| Light Gasoline |  | 0.002 |  | 0.001 |
| Heavy Gasoline | 0.240 | 0.009 | 0.176 | 0.004 |

Thus the hydrated catalyst reduces the nitrogen content of both the light and heavy gasolines to about 50% of that obtained with the unhydrated catalyst and a substantial reduction of the sulfur content of the heavy gasoline is also obtained in the high temperature zone which is obtained by the hydration of the catalyst.

Pressures which may be employed in this process include those pressures at which the conversions to be effected most efficiently take place. The catalytic conversion of petroleum hydrocarbons may be effected at pressures of between atmospheric and 1,000 lbs./sq. in. Preferably the catalytic cracking of gas oil and the like is effected at near atmospheric pressures, whereas the denitrogenation or desulfurization steps carried out on gasoline feed stocks may take place at pressures from 50 lbs./sq. in. to as high as 1500 lbs./sq. in. and preferably at a pressure between 250 and 750 lbs./sq. in.

The apparatus of the present invention will be more clearly understood by reference to the accompanying drawings, in which:

Figure 1 is a schematic flow diagram of the combination reaction and regeneration steps in which relatively low temperature catalyst is introduced countercurrent to the introduction of relatively high temperature feed stock;

Figure 2 is a plot of the temperature profile existing within the reaction zone of Figure 1;

Figure 3 shows the reaction zone into which relatively hot solids and relatively cold feed stock are introduced; and, Figure 4 is a plot showing the temperature profile in the reactor of Figure 3.

Referring now more particularly to Figure 1, the apparatus includes regenerator 10 and reaction vessel 12. Granular solids flow in regenerated form by means of lift line 14 from the bottom of regenerator 10 to hopper 16. The hot regenerated catalyst passes subsequently through catalyst cooler 18 and is introduced substantially at the temperature desired in the relatively low temperature reaction zone. The catalyst flows downwardly through reaction vessel 12, successively through seal gas introduction zone 20, sealing zone 22, product removal zone 24, the low temperature reaction zone 26, high temperature zone 28, feed inlet zone 30, second sealing zone 32, and second sealing gas inlet zone 34.

The spent granular catalyst is removed via line 36 at a rate controlled by means of valve 38 and is conveyed by lift line 40 to the top of regeneration zone 10.

The spent catalyst is regenerated by means of regeneration gas introduced into zone 10 by means of line 42 and the regeneration gases are removed therefrom by means of line 44. In the case of hydrocarbonaceous spent catalysts air is employed with or without diluent inert gases such as flue gas as the regeneration gas and the spent gases comprise flue gas.

The fluid to be contacted is passed via line 46 through heater 48 in which it is heated substantially to the temperature desired in high temperature reaction zone 28. The heated fluid then passes via line 50 at a rate controlled by valve 52 in accordance with temperature recorder controller 54 and is introduced into fluid inlet 30. By proper adjustment of valve 52 and valve 38 the mass specific heat ratio may be controlled to a value approximating 1.0, thereby establishing the temperature break substantially at the center of the contacting zone which includes reaction zones 26 and 28. Temperature recorder controller 54 is set to a control temperature which is substantially the average temperature of the high and low temperature reaction zones. This recorder may actuate either valve 52 or valve 38 to vary the mass specific heat ratio and thus maintain the temperature break at the desired position at which temperature-sensitive means 56, which may comprise a thermocouple, is positioned.

The hot fluid passes through high temperature zone 28, within which the high temperature reaction is effected, then through the temperature break zone between zones 26 and 28, and on through low temperature reaction zone 26. The products are removed therefrom via line 58 at a rate controlled by valve 60 and are sent to production or storage facilities not shown. Seal gas is introduced into zone 20 by means of line 62 and into second sealing zone by means of line 64. By this means also catalyst hydration is effected when steam is used as the seal gas.

As an example of the foregoing operation for the denitrogenation and desulfurization of catalytically cracked gasoline, a silica-alumina cracking catalyst is employed in which a mass specific heat ratio of 1.0 is maintained by countercurrently contacting the gasoline vapor (introduced at 800° F.), with 2.5 pounds of catalyst (introduced at 400° F.) per pound of gasoline feed. A reduction in sulfur content from 0.40% to 0.15% by weight and a reduction in nitrogen of from 0.1% to 0.002% by weight are obtained. The liquid yield is 96% by volume.

Referring now to Figure 2, graphical data indicating the temperature profile in reaction vessel 12 are shown for a reaction such as that illustrated above. Relatively cool catalyst or other granular solids flowing into the top of reaction vessel 12 have the temperature indicated by upper part of curve 70. The catalyst temperature rises from a point just above the mid-point of the contacting zone to the higher temperature indicated by the lower portion of curve 70 which indicates the temperature profile existing when the mass specific heat ratio is substantially equal to 1.0. Under conditions in which the mass specific heat ratio is less than 1.0 and in which the fluid flow dominates the temperature profile, the temperature break exists in the portion indicated by curve 72 in which case the temperature recorder controller 54 of Figure 1 is moved to control the temperature break, if desired, in the upper portion of the contacting zone. When the mass specific heat ratio is greater than 1 the temperature break moves to the lower portion of the contacting zone as indicated by curve 74. Thus the contact time of the catalyst and vapor is variable by changes in the position of the temperature break within the contacting zone. The sharpness of the temperature break as above described depends upon the heat transfer coefficient and the variation of specific heat with temperature. Curve 76 indicates the less sharp temperature break which exists with a poorer heat transfer coefficient or one in which a change in specific heat has no effect on increasing the heat gradient in the temperature break zone. In Figure 2 the temperatures shown are those which are satisfactory for 2-stage processing of hydrocarbon naphthas in which a simultaneous desulfurization reaction (favored by higher temperatures) and a denitrogenation reaction is effected.

Referring to Figure 3, portions of the apparatus which are analogous to those shown in Figure 1 are indicated herein by the same numbers. The reverse modification of the process described in Figure 1 is shown and which is particularly well adapted to preliminary removal of nitrogen hydrocarbons from cracking stocks. Granular solids and a fluid are countercurrently contacted but the granular solids are introduced at the relatively higher temperature, while the fluid is introduced at a relatively low temperature. In this modification no catalyst cooler equivalent to element 18 of Figure 1 is necessary unless the granular solids need to be introduced at a temperature lower than that at which they are discharged after conveyance from the regeneration zone. The fluid passing upwardly or countercurrently to the granular solids passes first through a relatively low temperature reaction zone 27 and subsequently through a relatively high temperature reaction zone 25.

An illustrative operation of the process described in Figure 3 is the combination denitrogenation and cracking of a gas oil having 0.15% nitrogen as nitrogen bases and an endpoint of 600° F. in which the lower temperature treatment involves an adsorption of the nitrogen hydrocarbons leaving a substantially nitrogen-free vapor. A silica-alumina bead cracking catalyst is introduced at 975° F. into the contacting column while gas oil vapor, passed countercurrent to the catalyst, is introduced at 625° F. The average mass specific heat ratio of the catalyst to oil is 1.5, i. e. the catalyst thermally dominates. A relatively short low temperature nitrogen hydrocarbon adsorption zone is thus established adjacent the vapor inlet thus removing nitrogen hydrocarbons (nitrogen bases mostly) by adsorption from the gas oil vapor and prevents their entry into the cracking zone. A 37% volumetric gasoline yield is hereby obtained compared to 20% when the preliminary adsorption zone is not established. The nitrogen hydrocarbons are then stripped or otherwise removed from the catalyst.

In Figure 4 a temperature profile in the reactor of Figure 3 is shown. Curve 80 indicates that the granular solids pass through high temperature reaction zone 25 at a relatively high temperature and pass through a relatively abrupt temperature break in which the temperature decreases to the relatively low temperature in reaction zone 27. This condition exists when a mass specific heat ratio equal to 1.0 at the average temperature is employed. Curve 82 indicates the position of the temperature break when a mass specific heat ratio less than 1.0 exists, whereas curve 84 indicates the position of the temperature break with specific heat ratios greater than 1.0 as in the foregoing example. The control temperature is indicated by point 86 of curve 80.

In the second modification the operation first subjects the fluid to a low temperature treatment, such as adsorption, and a subsequent high temperature treatment. This is particularly desirable, for example, in the simultaneous denitrogenation and desulfurization or cracking of petroleum fractions in a single catalyst bed since it has been found that the removal of nitrogen prior to either desulfurization or cracking exerts a very desirable effect upon the operation and also that the activity of the catalyst is decreased if it is first contacted with nitrogen-containing vapors and then subsequently employed in another reaction.

It should be understood that although the foregoing discussion has dealt specifically with the catalytic conversion of hydrocarbon fractions, the invention herein described relates generally to procedural operations for establishing zones of differing temperature in the undivided body of granular catalyst particles. The procedure is applicable with great advantage to the treating of hydrocarbon materials but is applicable to other catalytic operations in which successive treatment of a fluid with one catalyst and at two different temperature levels is of advantage.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for effecting the contact of a single fluid stream with a single granular solids stream at two substantially different temperature levels within a single contacting zone which comprises introducing said solids stream at one temperature level into one end of said contacting zone for passage therethrough, introducing said fluid stream at another temperature level into the other end of said contacting zone for countercurrent passage therethrough, and controlling the mass specific heat ratio of said solids to said fluid at a value of about 1.0 whereby said upper part of said contacting zone is maintained at a temperature substantially equal to the inlet temperature of said solids and the lower part of said contacting zone is maintained at a temperature substantially equal to the inlet temperature of said fluid, said process being effected in the absence of fluid vaporization, indirect heat exchange, or the introduction of additional streams of solids or fluids into said contacting zone to maintain the existence of said two substantially different temperature levels.

2. A method for effecting the contact of a fluid and granular solids which comprises passing a moving bed of granular solids through a contacting zone, flowing a fluid to be contacted simultaneously therethrough countercurrent to said solids, maintaining the ratio of the product of the mass flow rate and the specific heat of the solids to the product of the mass flow rate and the specific heat of the fluid at a value of about 1.0, said solids and said fluid being introduced into said contacting zone at substantially different temperatures to establish therein a volume of solids at a relatively low temperature and an adjacent volume of solids of relatively high temperature separated by a volume of solids having a sharp temperature gradient without the necessity of injecting additional streams of solids or fluids or the use of indirect heat transfer to maintain said adjacent volumes of solids at substantially different temperatures within said contacting zone.

3. A method for establishing two substantially distinct temperature levels in a continuous moving bed of solids in a fluid-solids contacting zone without indirect heat exchange steps and without the injection of additional streams of solids or fluids therein to establish said temperature levels which comprises passing a moving bed of granular solids through a contacting zone countercurrent to a flow therethrough of a fluid to be contacted, maintaining the temperature of the entering solids at a value substantially the same as one of the desired temperature levels, maintaining the temperature of the entering fluid substantially at the other temperature level, and controlling the flow rates of said solids and said fluid such that the product of the mass flow rate and the specific heat for the solids is substantially equal to the product of the mass flow rate and the specific heat of the fluid.

4. A method for establishing two finite treating zones of substantially different temperatures within a single fluid-solids contacting zone without the use of indirect heat exchange therein or the injection of additional streams of fluids or solids to maintain said different temperatures which comprises flowing a substantially compact moving bed of granular solids and a fluid to be contacted countercurrently through a contacting zone, maintaining the inlet temperature of the solids substantially at the temperature desired in one treating zone, maintaining the inlet temperature of the fluid substantially at the temperature desired in the other treating zone, and controlling the solids and fluid flow rate so that the heat capacity of the solids stream is substantially equal to the heat capacity of the fluid stream.

5. In a process for contacting a fluid with a moving mass of granular solids wherein a beneficial result is obtained by first contacting the fluid and the solids at one temperature and subsequently contacting them at a substantially different temperature, the improvement which eliminates the use of extraneous cooling or heating agents by the steps of flowing a stream of granular solids in countercurrent contact with a stream of fluid to be contacted through a contacting zone, maintaining the inlet temperature of the solids to the contacting zone substantially at one of the desired contacting temperatures, maintaining the inlet temperature of the fluid to the contacting zone substantially at the other desired contacting temperature, and maintaining the mass specific heat of the solids and fluid streams substantially equal.

6. A process for contacting a fluid stream with a granular solids stream successively at two substantially different desired temperature levels within a single contacting zone but without the use of extraneous heat exchange agents which comprises the steps of passing the granular solids as a moving bed through a contacting zone, flowing the fluids to be contacted therethrough countercurrent to said solids, maintaining the ratio of the mass specific heat of the solids stream to that of the fluid stream at a value substantially equal to 1.0, maintaining the temperature of the solids stream entering said contacting zone substantially at one of the temperature levels desired in said contacting zone, maintaining the temperature of the fluid stream entering the contacting zone substantially at the other temperature level desired in said contacting zone, continuously detecting the temperature gradient between said temperature levels within said contacting zone, and varying the flow rate of one of the streams flowing through said contacting zone to maintain said temperature gradient at a predetermined position therein.

7. A process according to claim 6 wherein the flow rate of said fluid stream is controlled to maintain said temperature gradient at a predetermined position.

8. A process for the catalytic conversion of hydrocarbons which comprises contacting said hydrocarbons with a solid granular conversion catalyst successively at two substantially different temperature levels in the absence of added streams of solids or quench fluids and of indirect heat transfer operations by the steps of bringing said hydrocarbons to one of said temperature levels, bringing said catalyst to the other of said temperature levels, passing said catalyst in a stream as a moving bed from one end of a contacting zone in countercurrent contact with a stream of said hydrocarbons passing from the other end of said contacting zone thereby establishing a finite zone therein at each of said temperature levels and separated by a temperature gradient, maintaining the ratio of the catalyst mass flow rate times its specific heat to the hydrocarbon feed mass flow rate times its specific heat at a value of about 1.0, continuously detecting the position of said temperature gradient within said contacting zone, varying the flow rate of one of said streams flowing through said contacting zone to maintain the position of said temperature gradient constant, removing spent catalyst from said contacting zone, contacting said spent catalyst with an oxygen-containing gas forming a regenerated catalyst free of hydrocarbonaceous material, and returning the regenerated catalyst to said contacting zone to contact further quantities of said hydrocarbons.

9. A process for catalytic conversion of hydrocarbons in which the hydrocarbons are treated first with the catalyst at a relatively low temperature and subsequently with catalyst at a relatively high temperature and in the absence of indirect heat exchange steps or the injection of additional streams of fluids or solids, which process comprises heating said catalyst to said relatively high temperature, passing said heated catalyst into a contacting zone for passage downwardly therethrough by gravity as a moving bed, introducing said hydrocarbons into said contacting zone at said relatively low temperature for passage therethrough countercurrent to said catalyst thereby establishing a lower zone of relatively low temperature and an upper zone of relatively high temperature separated by a temperature gradient within said contacting zone, maintaining a continuous downward flow of granular catalyst therethrough as a moving bed, maintaining a continuous countercurrent upward flow of hydrocarbon therethrough, maintaining the ratio of the catalyst mass flow rate times its specific heat to the hydrocarbon mass flow rate times its specific heat at a value substantially equal to 1.0, removing converted hydrocarbons from the top of said conversion zone, removing spent catalyst from the bottom thereof, regenerating said spent catalyst by treatment with an oxygen-containing gas, and returning the regenerated catalyst to said contacting zone.

10. A process according to claim 9 wherein said relatively low temperature zone is maintained at a temperature between about 300° F. and 700° F. and above the maximum boiling point of said hydrocarbon, said relatively high temperature zone is maintained at a temperature between about 700° F. and 1200° F., said hydrocarbon contains hydrocarbon compounds of nitrogen as contaminants, and wherein said contaminants are retained by adsorption on the catalyst in said relatively low temperature zone and prevented from entering said relatively high temperature zone with the unadsorbed fraction of said hydrocarbons.

11. A process according to claim 10 in combination with the step of passing the regenerated catalyst through an atmosphere of substantially pure steam prior to its introduction into said contacting zone.

12. A process according to claim 11 wherein said catalyst consists of a synthetic silica-alumina bead cracking catalyst.

13. A process for the catalytic conversion of hydrocarbons in which said hydrocarbons are treated first with the catalyst at a relatively high temperature and subsequently with the catalyst at a relatively low temperature without the necessity of indirect heat exchange or the injection of additional streams of solids or fluids, which process comprises introducing said catalyst into a contacting zone substantially at said relatively low temperature for passage downwardly therethrough by gravity as a moving bed, heating said hydrocarbons substantially to said relatively high temperature, passing the heated hydrocarbons into said contacting zone for passage therethrough countercurrent to said catalyst thereby establishing an upper zone of relatively low temperature and a lower zone of relatively high temperature separated by a temperature gradient within said contacting zone, maintaining a continuous downward flow of granular catalyst therethrough as a moving bed, maintaining a continuous upward flow of hydrocarbon therethrough, maintaining the ratio of the catalyst mass flow rate times its specific heat to the hydrocarbon mass flow rate times its specific heat at a value substantially equal to 1.0, removing converted hydrocarbons from the top of said conversion zone, removing spent catalyst from the bottom thereof, regenerating said spent catalyst by treatment with an oxygen-containing gas and returning the reegnerated catalyst to said contacting zone.

14. A process according to claim 13 wherein said relatively low temperature zone is maintained at a temperature between about 300° F. and 700° F. and above the maximum boiling point of said hydrocarbon, said relatively high temperature zone is maintained at a temperature between about 700° F. and 1200° F., said hydrocarbon contains hydrocarbon compounds of nitrogen as contaminants and wherein said contaminants are desorbed from said catalyst in said relatively high temperature zone and are subsequently readsorbed with fresh contaminants on said catalyst in said relatively low temperature zone by temperature control thereof within the said limits for return therewith to said high temperature zone thereby establishing an internal recycle of said contaminants, and removing a product containing hydrocarbons of greater volatility and ammonia as ultimate reaction products of said contaminants.

15. A process according to claim 14 in combination with the step of passing the regenerated catalyst through an atmosphere of substantially pure steam prior to its introduction into said contacting zone.

16. A process according to claim 15 wherein said catalyst consists of a synthetic silica-alumina bead cracking catalyst.

17. A process for the conversion of hydrocarbon fractions containing nitrogen hydrocarbons which comprises heating a granular conversion catalyst to a temperature between 700° F. and 1200° F., introducing the thus heated catalyst into a contacting zone, maintaining the flowing catalyst therein as a downwardly moving bed, heating a hydrocarbon stream containing hydrocarbon compounds of nitrogen to a temperature between 300° F. and 700° F., said temperature being less than the temperature to which said catalyst is heated and above the endpoint temperature of said hydrocarbons, passing the thus heated hydrocarbon through said contacting zone countercurrent to said catalyst flow, controlling the relative flows of catalyst and hydrocarbon so that the mass flow rate times the specific heat of the catalyst is substantially equal to the mass flow rate times the specific heat of said hydrocarbon thereby establishing a sharp temperature gradient intermediate a relatively low temperature nitrogen hydrocarbon adsorption zone adjacent the bottom and a relatively high temperature hydrocarbon cracking zone adjacent the top of said contacting zone without the use of extraneous heat exchange agents to heat and cool said catalyst within said contacting zone, continuously detecting the position therein of said temperature gradient, varying the mass flow rate of one of the streams flowing through said contacting zone to maintain the constant position of said temperature gradient, removing a cracked hydrocarbon product from said cracking zone, removing spent catalyst from said nitrogen hydrocarbon adsorption zone, stripping adsorbed nitrogen hydrocarbons from said spent catalyst, contacting said spent catalyst with an oxygen-containing gas to remove hydrocarbonaceous material therefrom forming a regenerated catalyst, contacting said regenerated catalyst with steam to form a hydrated catalyst, and returning the hydrated catalyst to said contacting zone.

18. A process for the conversion of hydrocarbon fractions containing nitrogen hydrocarbons which comprises providing a granular conversion catalyst at a temperature between 300° F. and 700° F., introducing this catalyst into the top of a contacting zone, maintaining the flowing catalyst therein as a downwardly moving bed, heating a hydrocarbon stream containing nitrogen hydrocarbons to a temperature of between 700° F. and 1200° F., said temperature being greater than the endpoint temperature of said hydrocarbon stream and greater than the temperature of the catalyst introduced into said contacting zone, passing the thus heated hydrocarbon stream through said contacting zone countercurrent to said catalyst flow, controlling the relative flows of catalyst and hydrocarbon so that the mass flow rate times the specific heat of the catalyst is substantially equal to the mass flow rate times the specific heat of the hydrocarbon thereby establishing a sharp temperature gradient intermediate a high temperature zone having a substantially uniform temperature between 700° F. and 1200° F. adjacent the bottom and low temperature zone having a substantially uniform temperature between 300° F. and 700° F. and below that of said high temperature zone and without the necessity of employing extraneous heat exchange agents to heat and cool said catalyst within said contacting zone to maintain said relatively low and said relatively high temperature zones therein, continuously detecting the position therein of said temperature gradient, varying the mass flow rate of one of the streams flowing through said contacting zone to maintain the constant position of said temperature gradient and the equality of said mass flow rates, removing a converted hydrocarbon product from said low temperature zone, removing spent catalyst from said high temperature zone, contacting said spent catalyst with an oxygen-containing gas to remove hydrocarbonaceous material therefrom forming a regenerated catalyst, contacting said regenerated catalyst with steam to form a hydrated catalyst, and returning the hydrated catalyst to said contacting zone.

19. A process according to claim 18 wherein said hydrocarbon is a gasoline containing hydrocarbons of nitrogen and sulfur.

References Cited in the file of this patent

UNITED STATES PATENTS

| 2,384,942 | Marisic | Sept. 18, 1945 |
| 2,387,378 | Wolk | Oct. 23, 1945 |
| 2,433,603 | Danner et al. | Dec. 30, 1947 |
| 2,441,170 | Rose et al. | May 11, 1948 |
| 2,448,257 | Evans | Aug. 31, 1948 |
| 2,489,628 | Evans | Nov. 29, 1949 |
| 2,614,968 | Simms | Oct. 21, 1952 |